US010038749B2

(12) United States Patent
Datsenko et al.

(10) Patent No.: US 10,038,749 B2
(45) Date of Patent: Jul. 31, 2018

(54) PRE-FETCH CACHE FOR VISUALIZATION MODIFICATION

(71) Applicant: Microsoft Corporation, Redmond, WA (US)

(72) Inventors: Dmitry Datsenko, Nesher (IL); Vit Karas, Svojetice (CZ); Haroon Ahmed, Bellevue, WA (US); Robert M. Bruckner, Redmond, WA (US); Andriy Garbuzov, Redmond, WA (US); Yury Berezansky, Qyryat Atta (IL); Yoav Yassour, Zikhron-Yaakov (IL); Boaz Chen, Moledet (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 180 days.

(21) Appl. No.: 14/518,683

(22) Filed: Oct. 20, 2014

(65) Prior Publication Data
US 2016/0112511 A1    Apr. 21, 2016

(51) Int. Cl.
G06F 15/167        (2006.01)
H04L 29/08         (2006.01)
(Continued)

(52) U.S. Cl.
CPC ............ *H04L 67/1095* (2013.01); *G06F 9/54* (2013.01); *H04L 43/045* (2013.01);
(Continued)

(58) Field of Classification Search
CPC ........ G06F 3/048; G06F 3/0483; G06F 9/542; G06F 17/30351; G06F 17/30994;
(Continued)

(56) References Cited

U.S. PATENT DOCUMENTS 6,360,273 B1    3/2002  Beurket et al.
6,622,168 B1 *  9/2003  Datta ................ G06F 17/30902
                                              707/E17.12
(Continued)

FOREIGN PATENT DOCUMENTS

IE    20010887 A2    10/2002

OTHER PUBLICATIONS

Rath, et al., "Live Model Transformations Driven by Incremental Pattern Matching", In Proceedings of the 1st International Conference on Theory and Practice of Model Transformations, Jul. 1, 2008, 15 pages.
(Continued)

*Primary Examiner* — Dustin Nguyen
(74) *Attorney, Agent, or Firm* — Medley, Behrens & Lewis, LLC

(57) ABSTRACT

Various technologies pertaining to modifying visualizations are described herein. A client computing device requests a visualization from a server computing device, and the server computing device constructs the visualization responsive to receipt of the request. The server computing device further identifies anticipated transformations for the visualization, and transmits the visualization and the transformations to the client computing device. The client computing device displays the visualization, and responsive to receipt of a request to modify the visualization, executes a transformation provided by the server computing device to update the visualization.

20 Claims, 11 Drawing Sheets

(51) Int. Cl.
 *H04L 12/26* (2006.01)
 *G06F 9/54* (2006.01)
(52) U.S. Cl.
 CPC .... *H04L 67/2842* (2013.01); *G06F 2209/541* (2013.01); *G06F 2209/545* (2013.01)
(58) Field of Classification Search
 CPC ......... G06F 17/30902; G06F 17/30905; H04L 67/2842; H04L 67/2847; H04L 67/2885
 USPC .......... 709/203; 715/760, 763, 764; 707/690
 See application file for complete search history.

(56) References Cited

U.S. PATENT DOCUMENTS

| | | | |
|---|---|---|---|
| 8,326,923 B1 | 12/2012 | Szabo et al. | |
| 8,346,885 B2 | 1/2013 | Fainberg et al. | |
| 8,626,136 B2 | 1/2014 | Ozzie et al. | |
| 8,832,184 B1* | 9/2014 | Britto | G06F 9/542 709/203 |
| 2004/0186840 A1 | 9/2004 | Dettinger et al. | |
| 2006/0253461 A1* | 11/2006 | de Bonet | G06F 17/30902 |
| 2008/0307330 A1* | 12/2008 | Louch | G06F 3/0483 715/763 |
| 2008/0307334 A1* | 12/2008 | Chaudhri | G06F 3/048 715/764 |
| 2011/0314091 A1* | 12/2011 | Podjarny | G06F 17/30905 709/203 |
| 2013/0111368 A1* | 5/2013 | Laughlin | G06F 17/30994 715/760 |
| 2014/0115090 A1 | 4/2014 | Hasek | |
| 2015/0379059 A1* | 12/2015 | Schroetel | G06F 17/30351 707/690 |

OTHER PUBLICATIONS

Sapia, Carsten, "Promise: Modeling and Predicting User Behavior for Online Analytical Processing Applications", Retrieved on: Jun. 26, 2014, Retrieved at: http://mediatum.ub.tum.de/doc/601699/601699.pdf, 70 Pages.

Sapia, Carsten, "Promise: Modeling and Predicting User Behavior for Online Analytical Processing Applications", Retrieved on: Jun. 26, 2014, Retrieved at: http://mediatum.ub.tum.de/doc/601699/601699.pdf, 94 Pages.

"Letter Accompanying the Amendments under Article 34 PCT for PCT Application No. PCT/US2015/056289", dated Apr. 12, 2016, 11 Pages.

"International Search Report & Written Opinion Issued in PCT Application No. PCT/US2015/056289", dated Jan. 25, 2016, 10 Pages.

"International Preliminary Report on Patentability for PCT Application No. PCT/US2015/056289", dated Jan. 16, 2017, 11 Pages.

"Written Opinion for PCT Application No. PCT/US2015/056289", dated Sep. 26, 2016, 4 Pages.

* cited by examiner

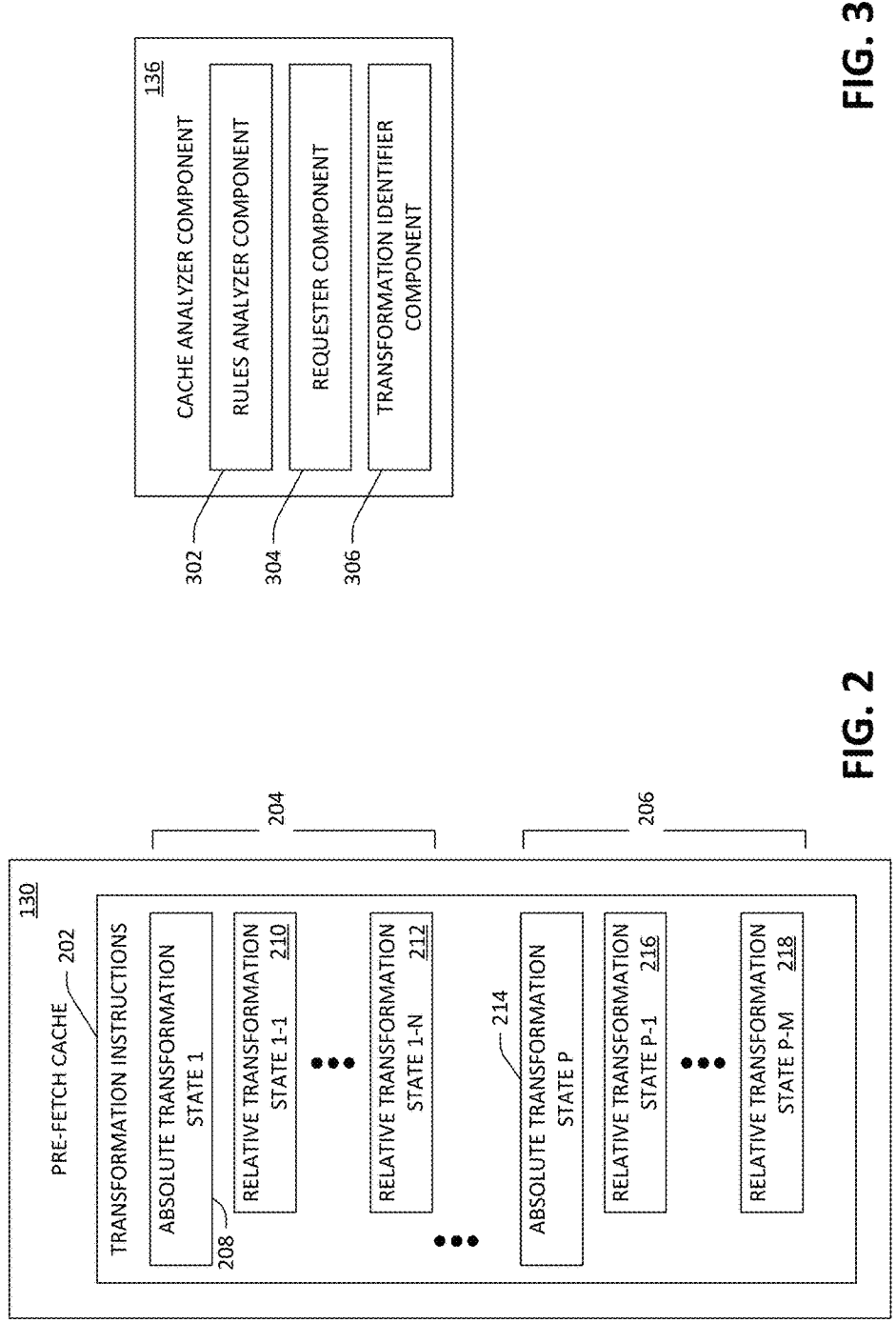

PRE-FETCH CACHE FOR VISUALIZATION MODIFICATION

BACKGROUND

Software applications have been developed to execute in a distributed manner, wherein a first portion of an application executes on a first device or logical partition, and a second portion of the application executes on a second device or logical partition. For instance, the first device or logical partition may be a client computing device, while the second device or logical partition may be a server computing device that is in communication with the client computing device by way of a network. In operation, a user can initiate the first portion of the application at the client computing device, wherein the first portion of the application is configured to open a communications channel between the client computing device and the server computing device, such that the second portion of the application is initiated.

In an example, the second portion of the application, when executed by the server computing device, can be configured to construct visualizations based upon user input received by the first portion of the application at the client computing device and data retained in data storage that is accessible to the server computing device. Oftentimes, construction of the visualization at the server computing device can be a processing-intensive task, as construction of the visualization (in some applications) can include executing queries over a relatively large database or other suitable data store.

Once the second portion of the application constructs the visualization, the server computing device transmits the visualization by way of a network connection to the client computing device, which then renders the visualization on a display. The user may then interact with the visualization (e.g., request a modification to the visualization), resulting in a request being transmitted to the server computing device to update the visualization or generate an entirely new visualization. The second portion of the application receives the request from the client computing device, performs requisite processing corresponding to the request, and then causes the server computing device to transmit the updated or new visualization back to the client computing device. This approach may negatively impact user experience, as the user is exposed to latencies associated with communications between the client computing device and the server computing device, as well as the processing time at the server computing device to generate the updated or new visualization.

SUMMARY

The following is a brief summary of subject matter that is described in greater detail herein. This summary is not intended to be limiting as to the scope of the claims.

A client computing device is described herein, where the client computing device is in network communication with a server computing device. The client computing device comprises a processor memory, the memory includes an application that is executed by the processor. The application comprises an interaction detector component that is configured to construct a command based upon a detected interaction with respect to a visualization presented on a display of the computing device, the visualization having a first visualization state that describes the visualization, the command indicating that the visualization is to be updated to have a second visualization state. The application also includes a pre-fetch cache that comprises transformations received by the client computing device from the server computing device, wherein each transformation in the transformations is labeled with a respective visualization state that results from execution of a transformation. The application further comprises a cache analyzer component that is configured to determine whether a transformation that is configured to update the visualization to the second visualization state is included in the pre-fetch cache based upon the visualization command and the first visualization state. The application also includes a visualization updater component that, responsive to the cache analyzer component determining that the transformation is included in the pre-fetch cache, is configured to update the visualization based upon the transformation such that the visualization has the second visualization state.

BRIEF DESCRIPTION OF THE DRAWINGS

FIG. 2 is a functional block diagram of an exemplary pre-fetch cache.

FIG. 3 is a functional block diagram of a cache analyzer component that is configured to identify a transformation in a pre-fetch cache based upon a detected user interaction with respect to a visualization.

DETAILED DESCRIPTION

Figure 1:
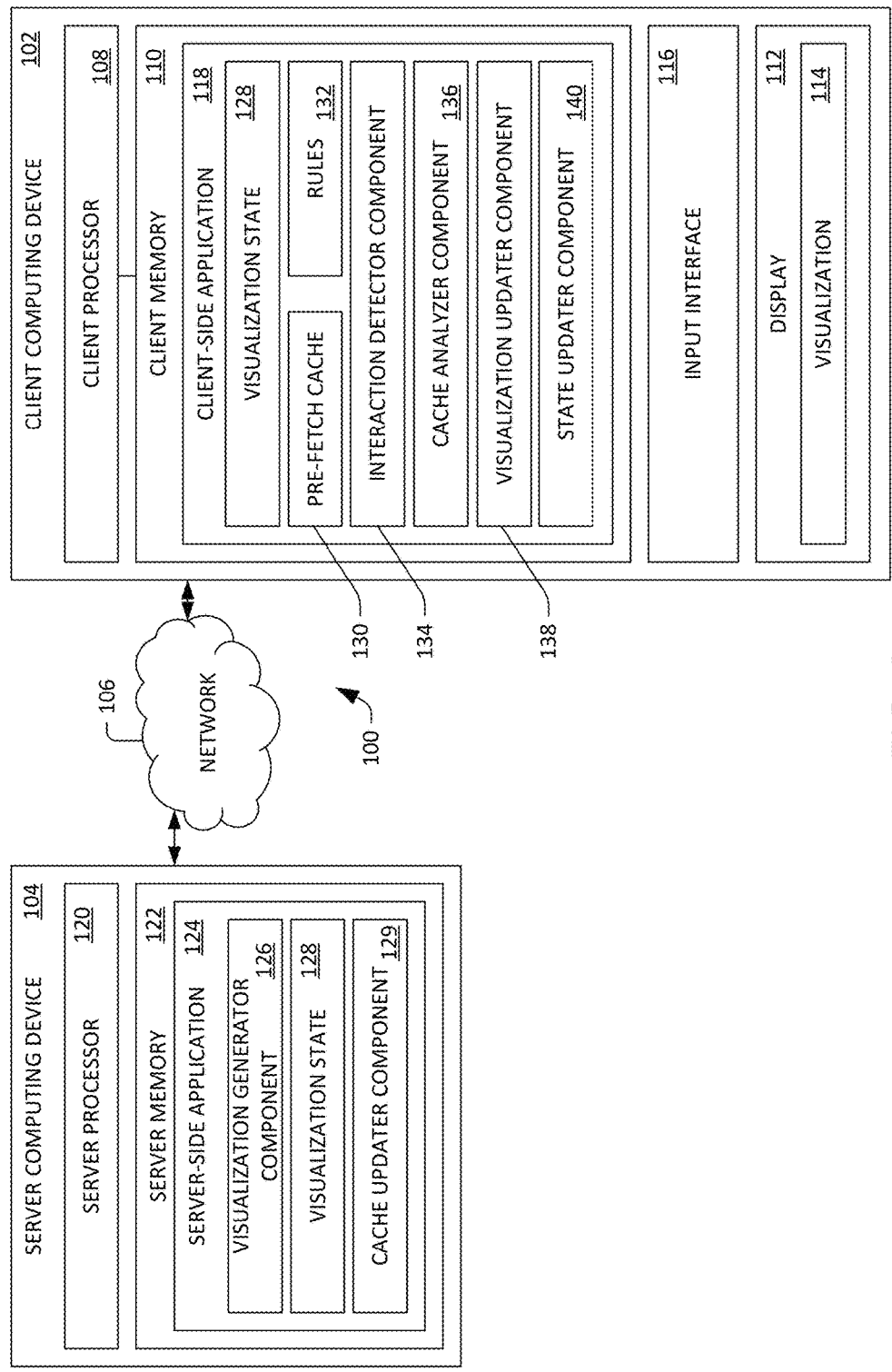
FIG. 1 is a functional block diagram of an exemplary system that facilitates presentment of a visualization on a display of a client computing device.

Various technologies pertaining to generating and updating visualizations are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, an exemplary system 100 that facilitates updating a visualization based upon a detected interaction with respect to the visualization is illustrated. The system 100 includes a client computing device 102 and a server computing device 104, wherein the client computing device 102 and the server computing device 104 are in communication with one another by way of a network 106. For example, the network 106 may be the Internet, an intranet, etc. Furthermore, in an exemplary embodiment, the client computing device 102 and the server computing device 104 may be in communication by way of a wired connection, such as by way of a Universal Serial Bus (USB) connection, FireWire, or other direct connection. The client computing device 102 may be any suitable type of client computing device including, but not limited to, a desktop computing device, a laptop computing device, a tablet (slate) computing device, a mobile telephone, etc. Likewise, the server computing device 104 may be a server in an enterprise environment, or may be included in a data center that comprises a plurality of server computing devices.

The client computing device 102 includes a client processor 108 and a client memory 110. The client memory 110 can include instructions that are executable by the client processor 108 as well as data that is accessible to the client processor 108. The client computing device 102 also includes or is in communication with a display 112, which, as will be described in greater detail below, can be configured to display a visualization 114 to a user of the client computing device 102. The client computing device 102 also includes an input interface 116 that is configured to receive and detect user input set forth at the client computing device 102 with respect to the visualization 114 presented on the display 112. For example, the input interface 116 may be or include a touch sensitive display, a keyboard, a microphone, a camera, some combination of the foregoing, etc.

The client memory 110 has a client-side application 118 loaded therein, wherein the client-side application 118 is executable by the client processor 108. The client-side application 118 may be a portion of a distributed application, wherein the server computing device 104 executes its counterpart.

With more particularity, the server computing device 104 comprises a server processor 120 and a server memory 122 that comprises a server-side application 124 that is executable by the server processor 120. Conceptually, the client-side application 118 and the server-side application 124 may be perceived as a single application. Typically, the server-side application 124 is configured to perform more computationally expensive tasks than those performed on the client computing device 102. In an example, the client-side application 118 and the server-side application 124 can operate in conjunction to process data in a (relative large) database and construct visualization based upon the processing of the data.

Accordingly, the server computing device 104 can include or have access to the data store (not shown), wherein the data store can comprise the database. The server-side application 124 can be configured to receive one or more queries from the client-side application 118, execute the one or more queries over the database (e.g., based upon a query received at the client-side application 118), and construct a visualization that represents results of processing the one or more queries over the database. In another example, the server-side application 124 can be configured to receive a command from the client-side application 118 to compute inferences (projections) based upon the command (e.g., where the command may request projected data points based upon data points in the database). This can be a relatively computationally expensive task, and is, therefore, typically better-suited for execution on the server computing device 104, rather than the client computing device 102. Other types of applications where distribution of tasks between a client computing device and a server computing device may be particularly well-suited include applications that are configured to perform video processing, videogame applications where light burning can occur at the server computing device 104, etc.

The server-side application 124 can comprise a visualization generator component 126 that can be configured to generate a visualization that is to be displayed on the display 112 of the client computing device 102. The visualization generator component 126 can generate such visualization responsive to receipt of a request from the client-side application 118 executing on the client computing device 102. For instance, a user may request that a query be executed over a database (e.g., which includes a data cube), and that a visualization that represents the result of the execution of the query over the database be displayed. The visualization generator component 126 can receive the request, and can generate the visualization.

Responsive to the visualization generator component 126 generating the visualization, the server-side application 124 can be configured to cause the server computing device 104 to transmit the visualization to the client computing device 102. The client-side application 118 receives the visualization and causes the visualization to be rendered on the display 112 (e.g., as the visualization 114). The visualization generator component 126, responsive to generating the visualization, can cause a visualization state 128 to be retained in a portion of memory allocated to the server-side application 124. For example, the visualization 114 can have a state that at least partially defines the visualization. For example, the state can define a type of the visualization (graph, chart, table, etc.), a number of data points to represent in the visualization, etc.

The server-side application 124 also includes a cache updater component 129 that is configured to anticipate user interactions with respect to the visualization 114 presented on the display 112 of the client computing device 102. The cache updater component 129 is further configured to construct transformations to visualizations based upon anticipated interactions. The server-side application 124 can anticipate interactions using hard-coded rules. In another example, the server-side application 124 can anticipate interactions based upon an algorithm with parameters that have been learned based upon observed behavior patterns of a user or set of users. The cache updater component 129, in an example, can update in the background on the server computing device 104 (e.g., when the server processor 120 has idle processing cycles). Exemplary types of interactions that may be anticipated by the cache updater component 130 may include, but are not limited to including, a request for additional data points with respect to the visualization 114 (e.g., representing data points in either direction along the X axis of a chart or graph), modification of a property of a visualization (e.g., a modification in a type of representation of the visualization 114, such as from a graph to a chart), etc. Responsive to constructing transformations, the cache updater component 129 can cause the server computing device 104 to transmit such transformations (and the visualization state 128) to the client computing device 102 by way of the network 106.

The client-side application 118, as indicated previously, receives the visualization constructed by the visualization generator component 126 and causes the visualization to be displayed on the display 112 as the visualization 114. Additionally, the visualization state 128 can be retained in a portion of client memory 110 allocated to the client-side application 118. Thus, the client-side application 118 and the server-side application 124 can both have knowledge of the visualization state 128 of the visualization 114 being presented on the display 112.

The client-side application 118 further includes a pre-fetch cache 130. Responsive to the client-side application 118 receiving the transformations from the cache updater component 129, the client-side application 118 can cause such transformations to be stored in the pre-fetch cache 130. As mentioned previously, the cache updater component 129 of the server-side application 124 can execute when the server processor 120 has idle processing cycles. Therefore, the pre-fetch cache 130 can be updated from time to time as transformations are received at the client computing device 102 from the server computing device 104 by way of the network 106.

As will be described in greater detail below, transformations in the pre-fetch cache 130 can be arranged in trees of transformations, where each tree comprises a plurality of nodes (with each node representing a transformation), and where each node is assigned a visualization state (the visualization state of a visualization after the transformation represented by the node has been executed). With still more detail, a tree of transformations can include a root node, which represents an absolute transformation, where an absolute transformation is a transformation that is independent of a visualization state. The tree of transformations can also include at least one child node, where a child node represents a relative transformation. The relative transformation is dependent upon a visualization state (e.g., the visualization state of a transformation represented by a parent node in the tree of transformations). Further, each transformation in the pre-fetch cache 130 can be or include instructions set forth in a declarative language that can be interpreted by the client-side application 118. This approach (transformations expressed in a declarative language and organized hierarchically) is markedly different from conventional approaches, which introduce latency or populate a cache with whole objects, which consumes more memory than the approach set forth herein, and further limits the ability of the client-side application 118 to interpret the cached object dynamically.

The client-side application 118 can further have rules 132 in a portion of the client memory 110 allocated to the client-side application, wherein the rules 132 are received from the server-side application 124. Generally, a rule in the rules 132 maps a pair [visualization state, command] to an updated visualization state. A command can pertain to a requested modification to the visualization 114 as set forth by the user of the client computing device 102. An exemplary command may be "Forecast (1)", which can represent a request to update the visualization 114 to forecast data points one month into the future. Thus, an exemplary rule can be as follows: "Visualization State 1+Forecast (1)→Visualization State 2."

The client-side application 118 also includes an interaction detector component 134 that is configured to detect interactions with respect to visualizations presented on the display 112. For example, a user can interact with the visualization 114 by way of the input interface 116, and the interaction detector component 134 can detect such interaction. Pursuant to an example, the interaction may represent a request to update the visualization 114. The interaction detector component 134, responsive to detecting the interaction, can be configured to construct a command, where the command is representative of the modification to be made to the visualization 114.

The client-side application 118 further includes a cache analyzer component 136, which is in communication with the interaction detector component 134. The cache analyzer component 136 is configured to receive the command constructed by the interaction detector component 134 and, responsive to receiving such command, is further configured to identify the visualization state 128 of the visualization 114. The cache analyzer component 136 is further configured to search the rules 132 based upon the visualization state 128 of the visualization 114 and the command received from the interaction detector component 134. Specifically, the cache analyzer component 136 searches the rules for a rule that includes the [visualization state 128, command] pair. When the rules 132 include such a rule, the cache analyzer component 136 identifies the updated visualization state mapped to the aforementioned pair.

When the cache analyzer component 136 is unable to identify a rule in the rules 132 that includes the [visualization state 128, command] pair, the cache analyzer component 136 causes the client computing device 102 to transmit the command to the server computing device 104 by way of the network 106. The visualization generator component 126 of the server-side application 124 is configured to receive the command and generate an updated visualization. Thereafter, the visualization generator component 126 is configured to update the visualization state 128 and transmit the updated visualization and the visualization state 128 to the client computing device 102. The cache updater component 129 can then be configured to act as described above, by constructing transformations based upon anticipated user interactions.

When the cache analyzer component 136, however, is able to identify a rule in the rules 132 that maps [visualization state 128, command] pair to an updated visualization state, the cache analyzer component 136 can be configured to search the pre-fetch cache 130 for a transformation that is labeled with the updated visualization state. In some cases, the pre-fetch cache 130 may include multiple transformations that cause the visualization 114 to be updated to the desired state. The cache analyzer component 136 can select a transformation in a variety of manners. For instance, the cache analyzer component 136 can select the first match, can search the pre-fetch cache 130 for the "optimal" transformation (e.g., the most efficient transformation), etc. The selected transformation, when applied to the visualization 114, results in creation of the updated visualization. The cache analyzer component 136 can be configured to output the transformation that is labeled with the updated visualization state.

The client-side application 118 also includes a visualization updater component 138 that is configured to update the visualization 114 based upon the transformation output by the cache analyzer component 136. When the transformation is a root node in a tree of transformations in the pre-fetch cache 130, the visualization updater component 138 can update the visualization 114 based solely upon the root node in the tree of transformations. When the transformation is a child node in the tree of transformations, the visualization updater component 138 can walk through transformations in the tree of transformations (potentially based upon a position in the tree of transformations of a transformation labeled with the visualization state 128), sequentially executing the transformations, to update the visualization 114.

The client-side application 118 can also include a state updater component 140 that is configured to update the visualization state 128 in the client-side application 118 responsive to the visualization updater component 138 updating the visualization 114, such that the visualization state 128 represents the current visualization state of the visualization 114 presented on the display 112. The state updater component 140 can also transmit a message to the server computing device 104, such that the visualization state 128 thereon can also be updated to represent the current state of the visualization 114 presented on the display 112. Responsive to the visualization state 128 being updated, the cache updater component 130 can be configured to anticipate new interactions that may be performed by a user of the client computing device 102 (e.g., based upon the updated visualization state).

While the system 100 has been described has having a client-server architecture, it is to be understood that aspects described herein can also be employed in one-tier applications, where different components have conventionally been configured to operate separately (analogous as to how the client computing device 102 and the server computing device 104 have been described as operating). That is, for example, the server-side application 124 may can reside in a first portion of memory of a computing device and the client-side application 118 can reside in a second portion of memory of the computing device. The server-side application 124 and the client-side application 118 may communicate as described above; in contrast to what has been described above, however, communication between the server-side application 124 and the client-side application 118 can be inter-process communication, such as named pipes, or intra-process communication.

Additionally, in an exemplary embodiment, the server-side application 124 can initiate a state change (e.g., without receiving an indication of an interaction with respect to the visualization 114 from the client-side application 118). This may occur, for instance, if a connection between the client computing device 102 and the server computing device 104 is lost, if there is a data update on the server computing device 104, etc. When the server-side application 124 initiates the state change, the server-side application 124 can cause the server computing device 104 to transmit a new visualization to the client computing device 102, and can further transmit data to the client computing device 102 that causes the client-side application 118 to delete all pre-fetched state information (e.g., contents of the pre-fetch cache 130 can be deleted, and the rules 132 can be deleted). The client-side application 118, responsive to receiving the visualization, can display such visualization as the visualization 114 on the display 112. The server-side application 124 can anticipate user interactions with respect to the visualization 114, as described above, and can cause the server computing device 104 to transmit updates rules and transformations to the client computing device 102.

Now referring to FIG. 2, an exemplary depiction of the pre-fetch cache 130 is illustrated. The pre-fetch cache 130 includes transformation instructions 202. The transformation instructions 202 can include a plurality of trees of transformations 204-206. As shown, the transformation instructions 202 include a first tree of transformations 204 through a pth tree of transformations 206.

The first tree of transformations 204 comprises a first plurality of transformations 208-212. Similarly, the pth tree of transformations 206 comprises a pth plurality of transformations 214-218. As indicated previously, each transformation in the transformation instructions 202 is labeled with a visualization state that is produced when the transformation is performed. Accordingly, the transformation 208 produces a visualization with a visualization state of 1, the transformation 210 produces a visualization with a visualization state of 1-1, the transformation 212 produces a visualization with a visualization state of 1-N, etc. It is to be noted that in some cases executing transformations in different trees (or even in a sub-tree) can bring the visualization to the same end state.

The transformations 208 and 214 in the transformation instructions 202 may be absolute transformations, in that execution of these transformations 208 and 214 is independent of a visualization state (e.g., the visualization state 128). In contrast, the transformations 210-212 and the transformations 216-218 are relative transformations, in that they respectively depend upon another visualization state. For instance, the transformation 210 depends upon the visualization state produced based upon execution of the absolute transformation 208. Similarly, the transformation 212 depends upon at least the visualization state produced based upon the absolute transformation 208.

Pursuant to an example, the visualization 114 presented on the display 112 may have the visualization state produced based upon the transformation 216 in the pth tree of transformations. The user may then interact with the visualization 114 on the display 112, such that a request for a visualization with a visualization state produced by the transformation 212 (in the first tree of transformations 204) is generated. To perform such transformation 212, transformations in the transformation tree hierarchically above the transformation 212 are executed in sequence prior to the transformation 212 being executed, beginning with the absolute transformation 208.

With reference now to FIG. 3, an exemplary depiction of the cache analyzer component 136 is shown. The cache analyzer component 136 includes a rules analyzer component 302 that is configured to search over the rules 132 responsive to the interaction detector component 134 outputting a command. As described above, the interaction detector component 134, based upon input detected at the input interface 116, is configured to construct a command based upon the interaction (the interaction being indicative of a desired modification to the visualization 114). The rules analyzer component 302 is configured to acquire the visualization state 128 and the command, and is further configured to search the rules 132 for another visualization state that is mapped to the pair of the visualization state 128 and the command.

The cache analyzer component 136 also includes a requester component 304 that, responsive to the rules analyzer component 302 failing to locate an updated visualization state based upon the visualization state 128 and the command, is configured to transmit the command to the server computing device 104. The server computing device 104, responsive to receipt of the command, can generate an updated visualization and transmit such visualization back to the client computing device 102 for presentment on the display 112.

When the rules analyzer component 302 identifies an updated visualization state in the rules based upon the current visualization state 128 and the command, a transformation identifier component 306 can locate the updated visualization state in the pre-fetch cache 130. Specifically, as noted above, each transformation is labeled with the visualization state that is produced when the transformation is executed. Therefore, the transformation identifier component 306 can search the pre-fetch cache 130 and identify the transformation that produces the updated visualization state. The transformation identifier component 306 may then be configured to output the identified transformation to the visualization updater component 138.

Figure 4:
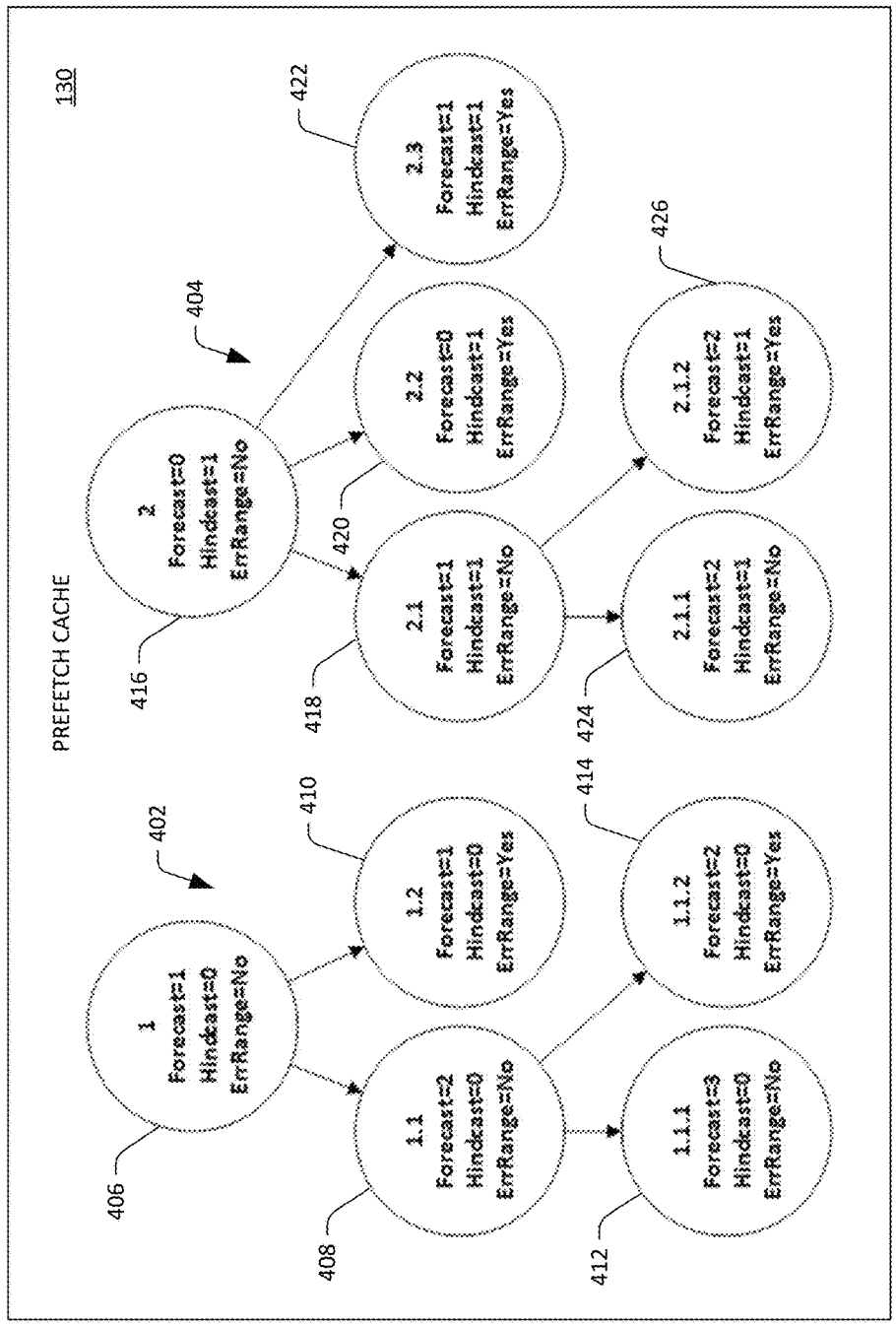
FIG. 4 illustrates an exemplary pre-fetch cache that comprises trees of transformations.

Turning now to FIG. 4, exemplary contents of the pre-fetch cache 130 for a particular type of application are illustrated. It is to be understood that the example set forth in FIG. 4 is for purposes of explanation, and is not intended to limit the scope of the claims to the below-described application or to the particular visualization states. In an exemplary embodiment, the application (e.g., the combination of the client-side application 118 and the server-side application 124) can be configured to execute queries over data cubes and present visualizations based upon such queries. Further, the application can be configured with a forecast feature that produces forecasts (projected data points forward in time) and/or a hindcast feature that produces hindcasts (projected data points backwards in time).

In an example, the data cube may include data about passengers of an airline between the years 2005 and 2013. The forecast feature can be configured to project data points into the future (e.g., for 2014, 2015, etc.), while the hindcast feature can be configured to project data points forward in time but relative to a time in the past. For example, the hindcast feature may be represented as follows: "how would the forecast look if it was created one year ago", where actual data from the last year is not taken into account when constructing the hindcast. The hindcast feature is particularly well-suited for estimating quality of a forecasting feature, such that a user can ascertain accuracy of a forecast with respect to actual data. In this example, then, a visualization state can be defined by three values: 1) a value that defines window of time for a forecast; 2) a value that defines a window of time of a hindcast; and 3) a value that indicates whether the visualization is to include an error range that represents uncertainty in the projections. Since the data points are projections, there is some uncertainty associated therewith—an error range can visually depict this uncertainty.

Given the foregoing, the pre-fetch cache 130 can include a first tree of transformations 402 and a second tree of transformations 404 (e.g., received from the server computing device 104). The first tree of transformations 402 includes a root transformation 406, which is a transformation that, when executed, produces the visualization state "1" defined by the following values: Forecast=1, Hindcast=0, and ErrRange=No (e.g., a visualization having the visualization state will display a forecast for one month, no hindcast, and no error range). The root transformation 406 is an absolute transformation, in that it can be executed regardless of the current visualization state 128.

The root visualization 406 has two immediate child transformations 408-410. The child transformation 408 produces the visualization state "1.1", which is defined by the values Forecast=2, Hindcast=0, and ErrRange=No. The child transformation 410, when executed, produces the visualization state "1.2", which is defined by the values Forecast=1, Hindcast=0, and ErrRange=Yes. The child transformations 408-410 are relative transformations, in that to produce either visualization state 1.1 or visualization state 1.2, the visualization 114 must have the visualization state of "1" prior to performing such transformations. Therefore, the visualization state 128 must be "1", or the root transformation 406 must be executed prior to either of the child transformations 408-410 being executed.

The first tree of transformations 402 also includes two additional child transformations 412 and 414, which are each an immediate child of the transformation 408. The transformation 412, when executed, produces a visualization with a visualization state "1.1.1", while the transformation 414, when executed, produces a visualization with a visualization state "1.1.2". Visualization state "1.1.1" is defined by the values Forecast=3, Hindcast=0, ErrRange=No, while visualization state "1.1.2" is defined by the values Forecast=2, Hindcast=0, ErrRange=Yes. Similar to what has been described above, with respect to the transformations 408 and 410, the transformations 412 and 414 are relative. That is, to perform the transformation 412 or the transformation 414, the visualization state 128 must be "1.1", or the visualization state must be driven to "1.1" (e.g., by executing the root transformation 406 followed by the transformation 408).

The second tree of transformations 404 has a root transformation 416, which, when executed, produces a visualization with visualization state "2". Visualization state "2" is defined by the values Forecast=0, Hindcast=1, ErrRange=No. The root transformation 416 is absolute, in that, the root transformation 416 does not depend upon visualization state. The second tree of transformations 404 also comprises child transformations 418-422, which are immediate children of the root transformation 416. When executed, the child transformation 418 produces a visualization with the visualization state "2.1", the child transformation 420 produces a visualization with a visualization state "2.2", and the child transformation 422 produces a visualization with a visualization state "2.3". Visualization state "2.1" is defined by the values Forecast=1, Hindcast=1, ErrRange=No, visualization state "2.2" is defined by the values Forecast=0, Hindcast=1, ErrRange=Yes, and visualization state "2.3" is defined by the values Forecast=1, Hindcast=1, ErrRange=Yes. Thus, for the transformations 418-422 to be performed, the visualization state 128 of the visualization 114 must be state "2". The visualization 114 may already have the visualization state "2", or may be caused to have the visualization state "2" through execution of the root transformation 416 over the visualization 114.

The second tree of transformations 404 also includes child transformations 424 and 426, which are immediate children of the transformation 418. The child transformation 424, when executed, produces a visualization with a visualization state of "2.1.1", while the child transformation 426, when executed, produces a visualization with a visualization state of "2.1.2". Visualization state "2.1.1" is defined by values Forecast=2, Hindcast=1, ErrRange=No, and visualization state "2.1.2" is defined by values Forecast=2, Hindcast=1, ErrRange=Yes.

An example pertaining to the pre-fetch cache 130 shown in FIG. 4 is now set forth. A user of the client computing device 102 can request a visualization corresponding to data in a data cube (e.g., the sales data referenced). In this example, it is to be assumed that the visualization 114 is affected by three parameters: 1) a number of months to forecast; 2) a number of months to hindcast; and 3) and whether an error range is to be shown for forecast data. The server-side application 124 can therefore receive a request to construct a visualization with a visualization state "0", which is defined by the values Forecast=0, Hindcast=0, ErrRange=No, and the visualization generator component 126 can construct the visualization (with visualization state "0") based upon the request. The visualization generator component 126 can then transmit the visualization (and the visualization state) to the client computing device 102, where the client-side application 118 then displays the visualization on the display 112 as the visualization 114. The visualization state 128 on the client computing device 102 and the server computing device 104 is updated to be state "0".

The user may then interact with the visualization 114 rendered on the display 112 (e.g., by way of the input interface 116). For example, the interaction detector component 134 can detect a request to produce a forecast of one month in the visualization. Responsive to receiving such request, the interaction detector component 134 can generate the following command: SetForecast=1. The cache analyzer component 136 can receive this command, and search over rules in the rules 132 for the pair [state "0", SetForecast=1]. Pursuant to an example, the rules 132 can include the following rule: [state "0", SetForecast=1]→state "1". The cache analyzer component 136, accordingly, can identify state "1" as being the visualization state requested by the user.

The cache analyzer component 136 may then search the pre-fetch cache 130 for a transformation that is labeled with visualization state "1". In this example, the root transformation 406 is labeled with visualization state "1". As this transformation is an absolute transformation, the visualization updater component 138 can apply such transformation 406 (independently), which results in production of a visualization with the desired visualization state (state "1"). The visualization state 128 is then updated (on both the client computing device 102 and the server computing device 104), and the visualization 114 displayed on the display 112 is updated in accordance with the request set forth by the user of the client computing device 102 (e.g., without the server computing device 104 constructing the visualization 114). While the example above has described the cache analyzer component 136 as searching the pre-fetch cache 130 based upon visualization state, it is to be understood that the cache analyzer component 136 can be configured to search the pre-fetch cache 130 based upon other types of data. For instance, the cache analyzer component 136 can be configured to search based upon variable values, where, in an example, the cache analyzer component 136 can search the pre-fetch cache 130 for a transformation that has certain variable values (e.g., the define a state).

Subsequently, the user of the client computing device 102 may further interact with the visualization 114 by way of the input interface 116, such that the user request a visualization with a hindcast of one month. The interaction detector component 134 can detect this interaction, and can produce the command SetHindcast=1 based upon the interaction. The cache analyzer component 136 can receive the command, and can search the rules 132 for the pair [state "1", SetHindcast=1]. For instance, the rules 132 can include the following rule: [state "1", SetHindcast=1]→state "2.1". The cache analyzer component 136, responsive to identifying the rule, can be then configured to search the pre-fetch cache 130 for a transformation labeled with the state "2.1". Here, it can be ascertained that the transformation 418 is labeled with state "2.1", and that the transformation 418 is a relative transformation.

Thus, prior to the transformation 418 being executed, the visualization state must be state "2". Since the value of the visualization state 128 is "1", the transformation 418 cannot be directly applied to the visualization 114 rendered on the display 112. Instead, the visualization state can be driven to state "2" by first executing the root transformation 416 (which is not dependent upon a visualization state), which drives the visualization to have state "2". Subsequently, the child transformation 418 is executed, thereby updating the visualization 114 to have the desired visualization state (state "2.1"). The state updater component 140 updates the visualization state 128 to be state "2.1", and transmits the visualization to the server computing device 104, such that the cache updater component 130 can generate further transformations based upon the current visualization state of the visualization 114 shown on the display 112.

Figure 5:
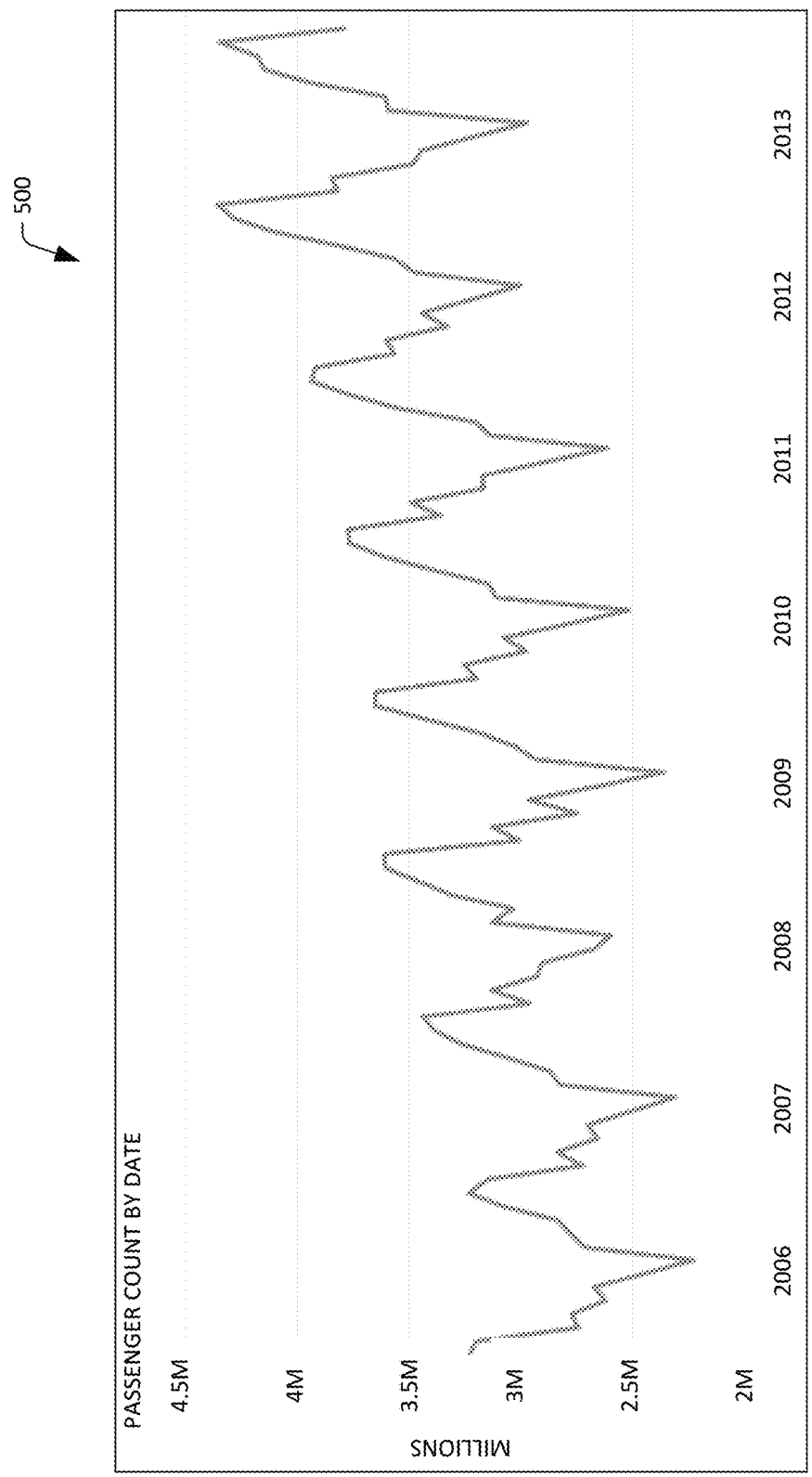
FIGS. 5-8 illustrate exemplary visualizations.
Figure 6:
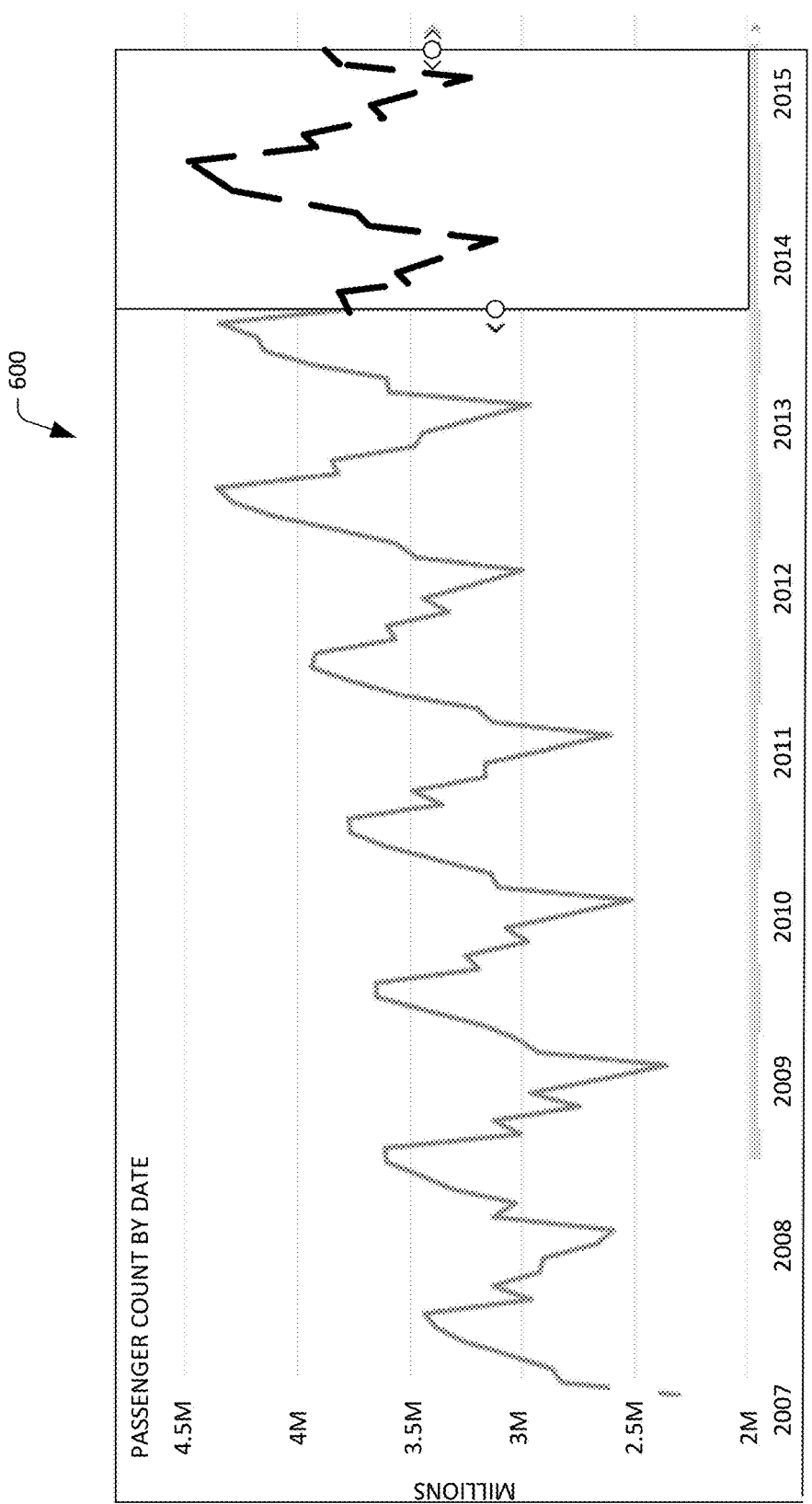
Figure 7:
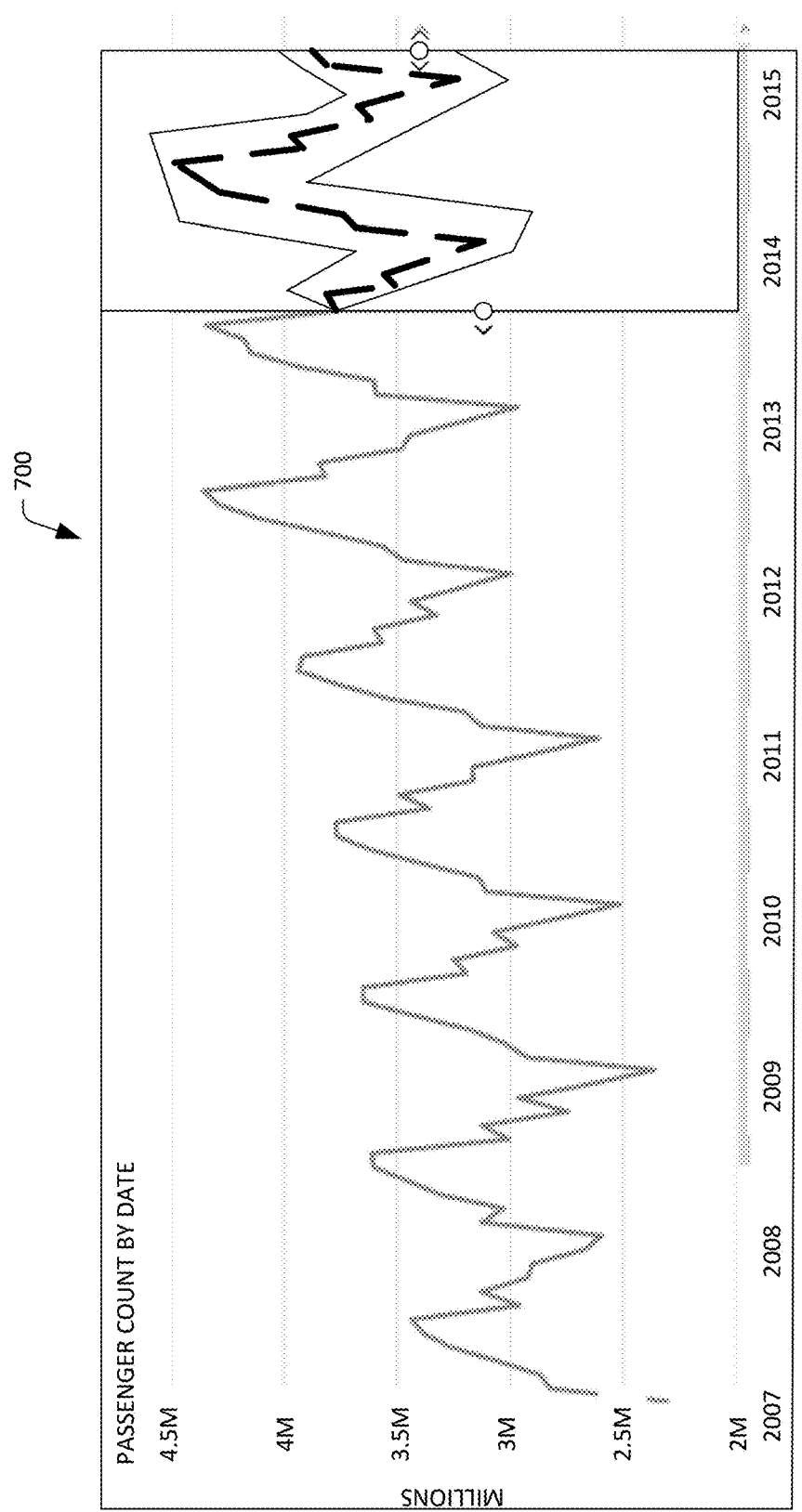
Figure 8:
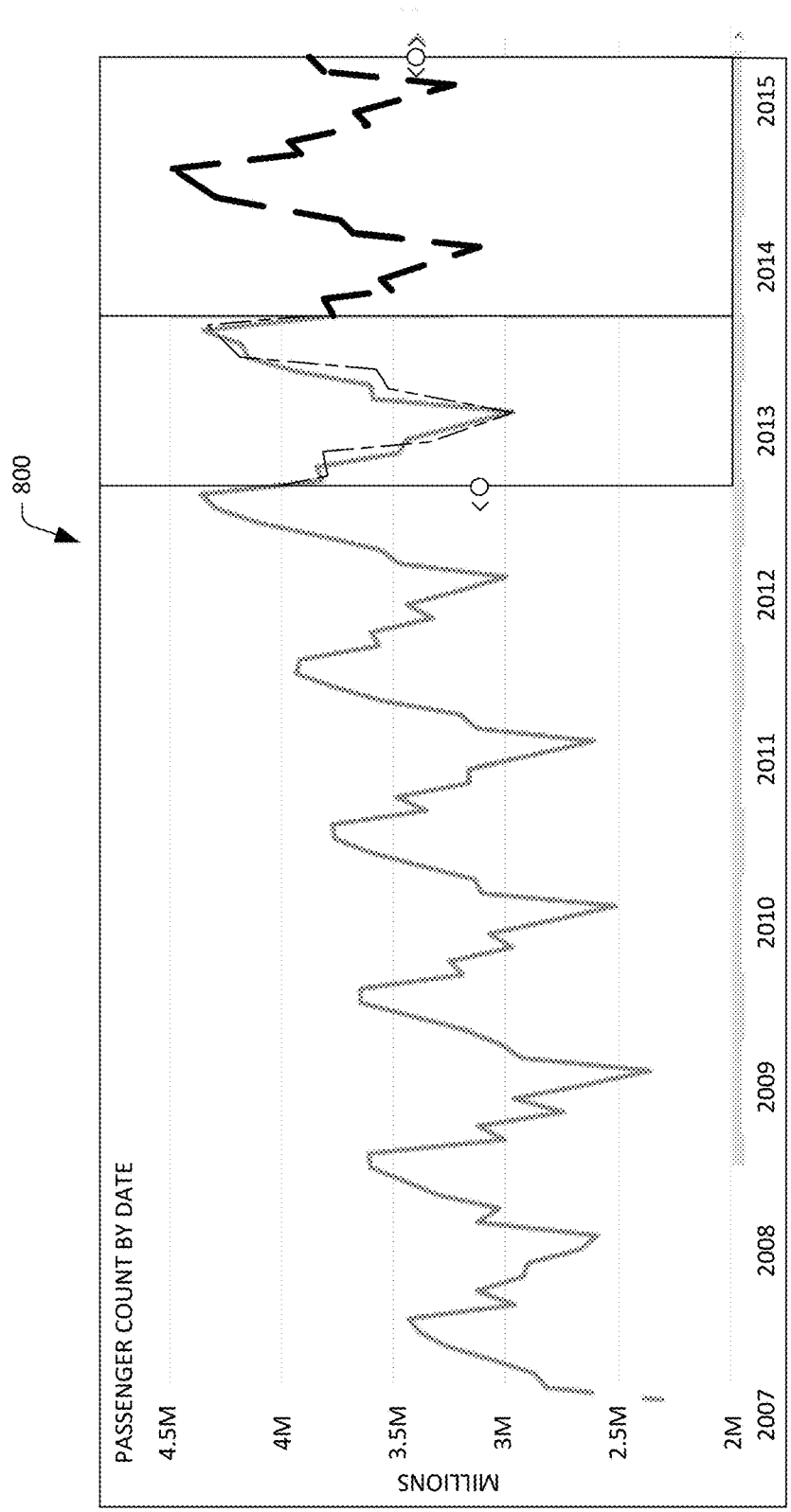

With reference to FIG. 5, an exemplary visualization 500 corresponding to visualization state "0" (referenced above) is illustrated. It can be ascertained that the visualization 500 does not include any forecast data points or hindcast data points. Turning to FIG. 6, a visualization 600 with visualization state "1" is illustrated, where a one-month forecast is presented (illustrated with dashed lines), but no hindcast is shown and no error range is presented (e.g., Forecast=1; Hindcast=0; and ErrRange=No). Referring now to FIG. 7, a visualization 700 with visualization state "1.2" is illustrated, where a one-month forecast is presented (shown in dashed line), and the one-month forecast is assigned an error range (shown as lines surrounding the forecast). Visualization state "1.2" is defined by values (Forecast=1, Hindcast=0, and ErrRange=Yes). Visualization state "1.2" can be reached directly from visualization state "1" in the first tree of transformations 402. With reference now to FIG. 8, an exemplary visualization 800 with visualization state "2.1" is illustrated, where visualization state "2.1" is defined by values (Forecast=1, Hindcast=1, ErrRange=No). Thus, the visualization 800 includes a forecast (shown in dark dashed line) and a hindcast (shown in dashed line together with observed data).

In the examples set forth above, the visualization 500 can be constructed by the server computing device 104 and transmitted to the client computing device 102. The server computing device 104 can then transmit the trees of transformation 402 and 404 for inclusion in the pre-fetch cache 130. When the user requests the visualization 600, the root transformation 406 can be executed over the visualization 500 to produce the visualization 600, thereby reducing latencies associated with conventional systems (e.g., latencies associated with transmissions over the network 106, processing performed at the server computing device 104, etc.). When the user requests the visualization 700 (from the visualization 600), the relative transformation 410 can be executed over the visualization 600 to produce the visualization 700. When the user requests the visualization 800 (from the visualization 700), the transformation visualization state "2.1" is identified in the second tree of transformations 404, and the cache analyzer component 136 executes the root transformation 416, followed by the relative transformation 418.

Figure 9:
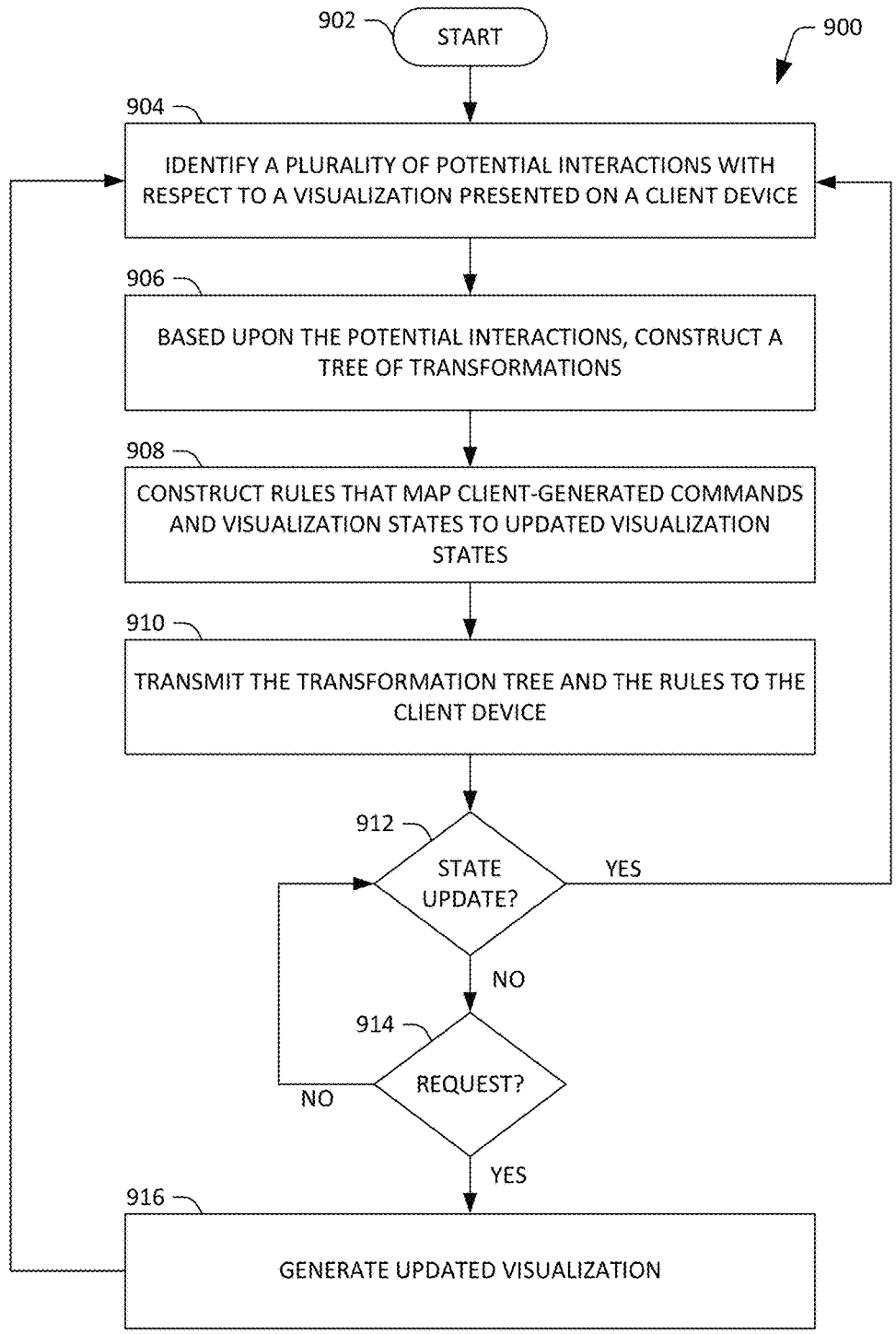
FIG. 9 is a flow diagram that illustrates an exemplary methodology for updating a visualization.
Figure 10:
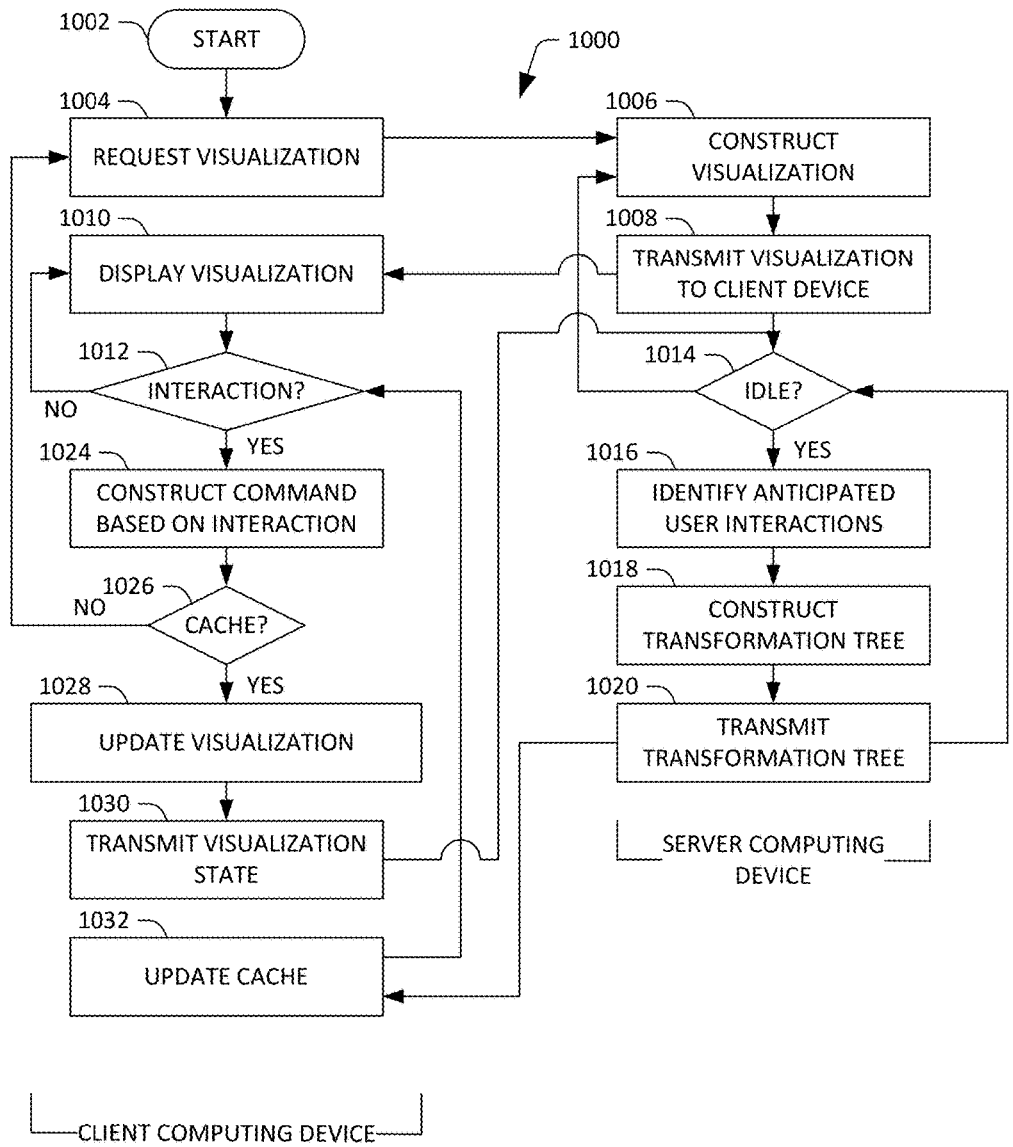
FIG. 10 is a flow diagram that illustrates exemplary communications between a client computing device and a server computing device when a visualization is updated.
Figure 11:
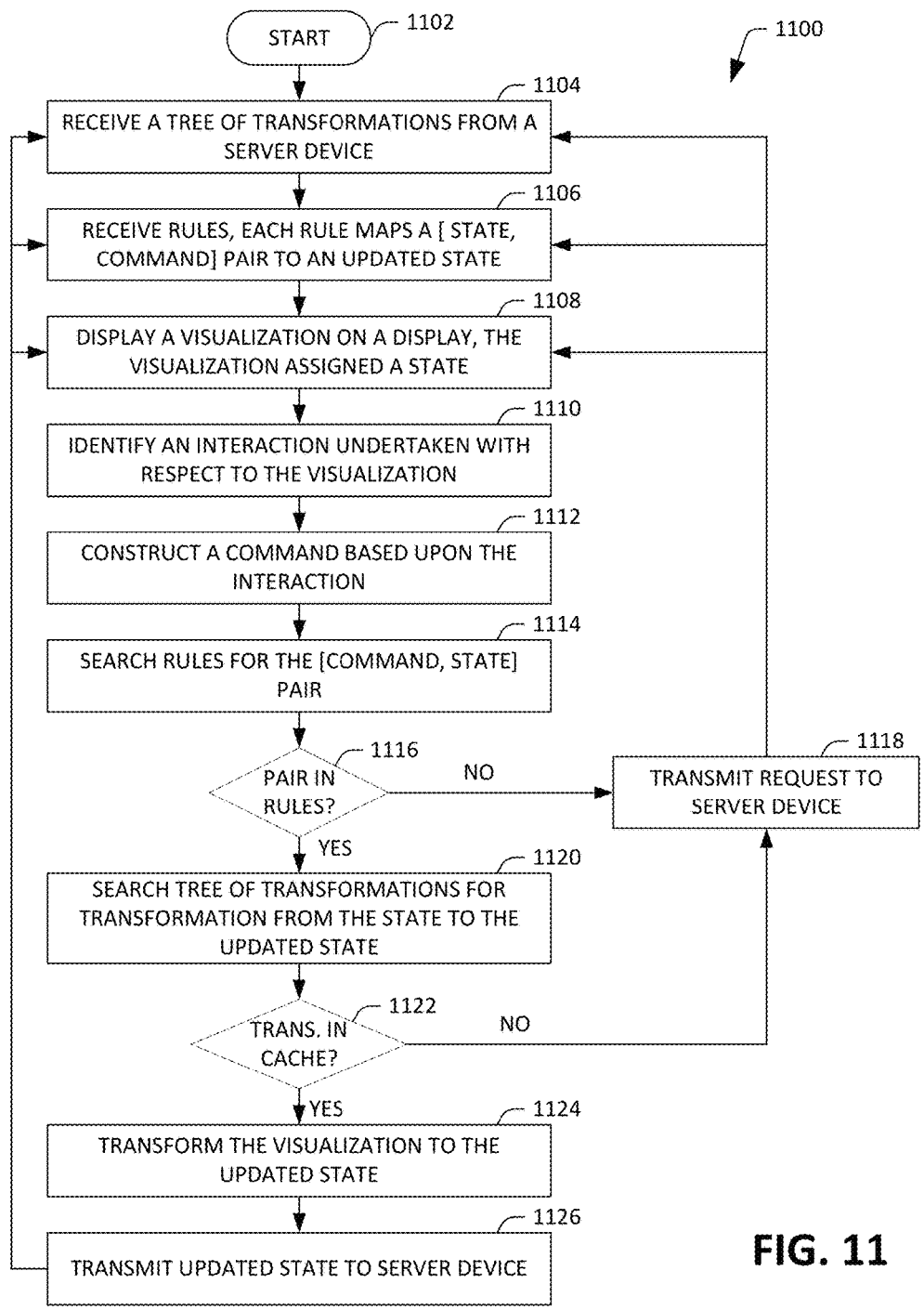
FIG. 11 is a flow diagram that illustrates an exemplary methodology executed at a client computing device when updating a visualization displayed on a display.

FIGS. 9-11 illustrate exemplary methodologies relating to updating visualizations. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 9, an exemplary methodology 900 that facilitates constructing the pre-fetch cache 130 is illustrated. Accordingly, the methodology 900 can be executed by the server computing device 104. The methodology 900 starts at 902, and at 904, a plurality of potential interactions that may be undertaken by a user with respect to a visualization presented on a client device are identified. These interactions can be identified based upon, for example, a known set of possible interactions with respect to a visualization having a particular visualization state. In another example, when there are a relatively large number of potential interactions, inferences can be made over such potential interactions to identify interactions that are most likely to be performed by the user. Such interactions can be identified based upon historic use of an application, historic interactions performed given particular visualization states, or the like.

At 906, based upon the potential interactions identified at 904, a plurality of transformations are generated. Further, such transformations can be arranged in trees of transformations, wherein a root transformation in a tree of transformations is an absolute transformation and a child transformation in the tree of transformations is a relative transformation.

At 908, rules are constructed that map different visualization states to one another by way of a command. At 910, the tree of transformations constructed at 906 and the rules constructed 908 are transmitted by way of a network to the client computing device. There, the client computing device can retain the rules and can retain the tree of transformations in the pre-fetch cache 130.

Optionally, at 912, a determination can be made regarding whether there has been an update to the state of the visualization being displayed at the client computing device. If an update has been made (or there are idle processing cycles), the methodology 900 can return to 904, where more interactions can be identified. At 914, a determination is made regarding whether a request for a visualization has been received from the client computing device. If there is been no request for a visualization, the methodology can return to 904, where additional interactions can be identified. If a request for a visualization has been received, the methodology 900 proceeds to 916, where an updated visualization is generated based upon the request. The updated visualization may then be transmitted to the client computing device for presentment on the display 112. The methodology 900 can then return to 904, where a plurality of potential interactions, with respect to the transmitted visualization, can be identified. As indicated previously, the acts 904-910 may be executed by the server computing device 104 in the background when there are idle processing cycles.

Turning now to FIG. 10, an exemplary methodology 1000 that can be jointly executed by the client computing device 102 and the server computing device 104 is illustrated. The methodology 1000 starts at 1002, and at 1004 the client computing device 102 requests a visualization from the server computing device 104. At 1006, the server computing device 104 receives the request and constructs a visualization based upon the request. The visualization may be any suitable visualization, including a graph, a chart, an animation, etc. At 1008, the visualization constructed at 1006 is transmitted to the client computing device 102, and at 1010, the visualization is displayed on the display 112.

At 1012, a determination is made regarding whether an interaction with respect to the display visualization has been detected. If there is no interaction detected, the methodology returns to 1010, where the visualization is displayed. Meanwhile, on the server computing device 104, at 1014, a determination is made regarding whether there are idle processing cycles on the server computing device 104. If there are no idle processing cycles, the methodology 1000 returns to 1006, where visualizations are constructed or other computing tasks are performed at the server computing device 104. If at 1014, a determination is made that there are idle processing cycles, the methodology 1000 proceeds to 1016, where anticipated user interactions are identified. At 1018, a tree of transformations is constructed, and at 1020, the tree of transformations is transmitted to the client computing device 102. At 1022, the pre-fetch cache 130 is updated on the client computing device to include the tree of transformations. While act 1018 describes generation of a single tree of transformations, it is to be understood that multiple trees of transformations can be constructed and transmitted to the client computing device 102 at 1020.

Returning to 1012, if an interaction has been detected, then at 1024, at the client computing device 102, a command is constructed based upon the detected interaction. At 1026, a determination is made regarding whether the pre-fetch cache 130 has a transformation therein that will produce the requested visualization (such that the visualization has an updated visualization state). As described previously, the transformation can be identified by first parsing through the rules 132 and then using an updated state identified in the rules to locate a transformation in the pre-fetch cache 130. If the pre-fetch cache 130 does not include an appropriate transformation, the methodology 1000 returns to 1004, where the client computing device 102 requests a visualization from the server computing device 104.

If at 1026 it is determined that the pre-fetch cache 130 includes an appropriate transformation, then the methodology 1000 proceeds to 1028, where the transformation is used to update the visualization. As described previously, when the transformation is a relative transformation, it is possible that a sequence of transformations are performed to generate the updated visualization. At 1030, the updated visualization state is transmitted to the server computing device 104, such that updated (anticipated) interactions can be identified.

In some situations, some or all transformations in the pre-fetch cache 130 may be removed from the pre-fetch cache 130. For instance, the server computing device 104 can transmit an instruction to the client computing device 102, wherein the instruction, when received by the client-side application, 118, causes the client-side application 118 to remove one or more entries from the pre-fetch cache 130. This may occur, for instance, when the server-side application 104 receives an indication that the visualization 114 has or is to have a state, where anticipated interactions with respect to such state are not supported by current transformations in the pre-fetch cache 130. In another example, the client computing device 102 may cause one or more entries to be removed from the pre-fetch cache 130 when there is memory pressure at the client computing device 102. Additionally or alternatively, when the client computing device 102 detects memory pressure, the client computing device 102 can transmit a signal to the server computing device 104, wherein the signal indicates existence of the memory pressure. The server computing device 104, responsive to receiving the signal, can provide access to the signal (or a portion thereof) to the server-side application 124, which can execute logic to identify which transformations to flush from the pre-fetch cache 130 (e.g., least likely transformations, redundant transformations, etc.). The server computing device 104 may then transmit instructions to the client computing device 102, which cause the client computing device 102 to remove transformation(s) from the pre-fetch cache 130 identified in the instructions received from the server computing device 104.

Now referring to FIG. 11, an exemplary methodology 1100 that can be executed by the client computing device 102 is illustrated. The methodology 1100 starts at 1102, and at 1104, a tree of transformations is received from a server computing device. At 1106, rules are received, where each rule maps a [state, command] pair to an updated visualization state. At 1108, a visualization is displayed on a display, wherein the visualization is assigned a visualization state.

At 1110, an interaction undertaken with respect to the visualization is identified. This interaction may be a request to alter the visualization (e.g., such that the visualization has an updated state). At 1112, a command is constructed based upon the interaction identified at 1110. At 1114, the rules are searched for [command, state] pair. At 1116, a determination is made regarding whether the aforementioned pair is represented in the rules. If the pair is not in the rules, then, at 1118, a request for an updated visualization is transmitted to the server computing device 104. Thereafter, the methodology 1100 can proceed to any of acts 1104, 1106 or 1108.

If at 1116 it is determined that the above-mentioned pair is included in a rule in the rules, the methodology 1100 proceeds to 1120, where the tree of transformations is searched for the updated visualization state identified in the rule. At 1122, a determination is made regarding whether a transformation labeled with the updated state is included in the pre-fetch cache 130. If there is no transformation in the pre-fetch cache 130 labeled with the updated state, the methodology 1100 proceeds to 1118, where a request for an updated visualization is transmitted to the server computing device 104. If it is determined that the transformation is included in the pre-fetch cache 130, then at 1124 the visualization is updated to have the updated visualization state. At 1126, the updated visualization state is transmitted to the server computing device 104.

Various examples are now set forth.

Example 1

A client computing device that is in network communication with a server computing device, the client computing device comprising: a processor; and a memory that comprises an application that is executed by the processor, the application comprises: an interaction detector component that is configured to construct a command based upon a detected interaction with respect to a visualization presented on a display of the computing device, the visualization having a first visualization state that describes the visualization, the command indicating that the visualization is to be updated to have a second visualization state; a pre-fetch cache that comprises transformations received by the client computing device from the server computing device, wherein each transformation in the transformations is labeled with a respective visualization state that results from execution of a transformation; a cache analyzer component that is configured to determine whether a transformation that is configured to update the visualization to the second visualization state is included in the pre-fetch cache based upon the visualization command and the first visualization state; and a visualization updater component that, responsive to the cache analyzer component determining that the transformation is included in the pre-fetch cache, is configured to update the visualization based upon the transformation such that the visualization has the second visualization state.

Example 2

A client computing device according to Example 1, the application further comprises a state updater component that is configured to transmit a message to the server computing device responsive to the visualization updater computing updating the visualization, the message indicating that the visualization has the second visualization state.

Example 3

A client computing device according to any of Examples 1-2, the application further comprises a requester component that, responsive to the cache analyzer component determining that the pre-fetch cache fails to include the transformation, is configured to transmit a request to the server computing device to update the visualization, wherein the application is configured to render the updated visualization on the display responsive to receiving the updated visualization from the server computing device.

Example 4

A client computing device of any of Examples 1-3, further comprising an input interface that is configured to receive the interaction with respect to the visualization, the input interface being a touch-sensitive display.

Example 5

A client computing device according to any of Examples 1-4, the transformation is written in a declarative language.

Example 6

A client computing device according to any of Examples 1-5, the application comprises a set of rules, the set of rules comprises a rule that maps a pair that includes: the first visualization state; and the command to the second visualization state, wherein the cache analyzer component is configured to determine that the pre-fetch cache comprises the transformation by searching the set of rules based upon the first transformation state and the command.

Example 7

A client computing device according to any of Examples 1-6, the pre-fetch cache comprises a tree of transformations, wherein the transformation is included as a node in the tree of transformations.

Example 8

A client computing device according to Example 7, wherein the transformation is a root transformation in the tree of transformations, the root transformation being an absolute transformation that is independent of the first visualization state.

Example 9

A client computing device according to Example 7, wherein the transformation is a child transformation in the tree of transformations, the child transformation being a relative transformation that is dependent upon a visualization state.

Example 10

A client computing device according to any of Examples 1-9, the visualization being one of a chart, a graph, or a table.

Example 11

A method executed by a client computing device that is in communication with a server computing device, the method comprising: displaying a visualization on a display, the visualization has a first visualization state that at least partially defines the visualization; receiving, from the server computing device, a transformation that, when applied to the visualization, causes the visualization to have a second visualization state that differs from the first visualization state; storing the transformation in a pre-fetch cache on the client computing device; detecting a request to modify the visualization; responsive to detecting the request, identifying that the transformation in the pre-fetch cache satisfies the request; and responsive to identifying that the transformation in the pre-fetch cache satisfies the request, updating the visualization using the transformation in the pre-fetch cache such that the visualization has the second visualization state.

Example 12

A method according to Example 11, further comprising: receiving a second request to modify the visualization; responsive to receiving the second request, identifying that the pre-fetch cache fails to include a second transformation that satisfies the second request; requesting an updated visualization from the server computing device responsive to identifying that the pre-fetch cache fails to include the second transformation; receiving the updated visualization from the server computing device; and displaying the updated visualization on the display.

Example 13

A method according to any of Examples 11-12, the transformation being in a declarative language.

Example 14

A method according to any of Examples 11-13, wherein identifying that the transformation in the pre-fetch cache satisfies the request comprises: identifying that the request corresponds to the second visualization state; searching through the pre-fetch cache based upon the second visualization state; and identifying that the transformation is assigned the second visualization state.

Example 15

A method according to Example 14, further comprising: identifying a sequence of transformations that are to be applied to the visualization to satisfy the request, where the transformation is last in the sequence of transformations; and using the sequence of transformations to update the visualization.

Example 16

A method according to any of Examples 11-15, the transformation being an absolute transformation that is independent of the visualization having the first state.

Example 17

A method according to any of Examples 11-15, the transformation being a relative transformation that is dependent upon the visualization having the first state.

Example 18

A method according to any of Examples 11-17, further comprising: receiving a plurality of rules, each rule in the plurality of rules maps an initial visualization state to a destination visualization state by way of a respective command, wherein identifying that the transformation in the pre-fetch cache satisfies the request comprises searching the plurality of rules for a rule that includes both the first visualization state and a command that corresponds to the request, the command constructed by the client computing device responsive to detecting the request to modify the visualization.

Example 19

A method according to any of Examples 11-18, further comprising: transmitting a request for the visualization to the server computing device, the request identifying a data cube; and receiving the visualization from the server computing device, the visualization being one of a chart, a graph, or a table that is based upon contents of the data cube.

Example 20

A computer-readable storage medium on a client computing device, the computer-readable storage medium comprises instructions that, when executed by the processor, cause the processor to perform acts comprising: displaying a visualization on a display, the visualization has a first visualization state; receiving, from a server computing device in network communication with the client computing device, a tree of transformations, each transformation in the tree of transformations corresponds to a respective visualization state; receiving, from the server computing device, a plurality of rules, each rule maps respective visualization states to one another by way of a respective command; detecting an interaction with respect to the visualization displayed on the display; responsive to detecting the interaction, generating a command, the command being indicative of a modification to be made to the visualization; identifying a rule in the plurality of rules that includes the first visualization state and the command; based upon the rule, identifying a transformation in the tree of transformations that facilitates performance of the modification to be made to the visualization; and rendering the modification of the visualization on the display based upon the transformation in the tree of transformations.

Example 21

A client computing device comprising: means for displaying a visualization on a display, the visualization has a first visualization state that at least partially defines the visualization; means for receiving, from the server computing device, a transformation that, when applied to the visualization, causes the visualization to have a second visualization state that differs from the first visualization state; means for storing the transformation in a pre-fetch cache on the client computing device; means for detecting a request to modify the visualization; means for identifying that the transformation in the pre-fetch cache satisfies the request; and means for updating the visualization using the transformation in the pre-fetch cache such that the visualization has the second visualization state.

Figure 12:
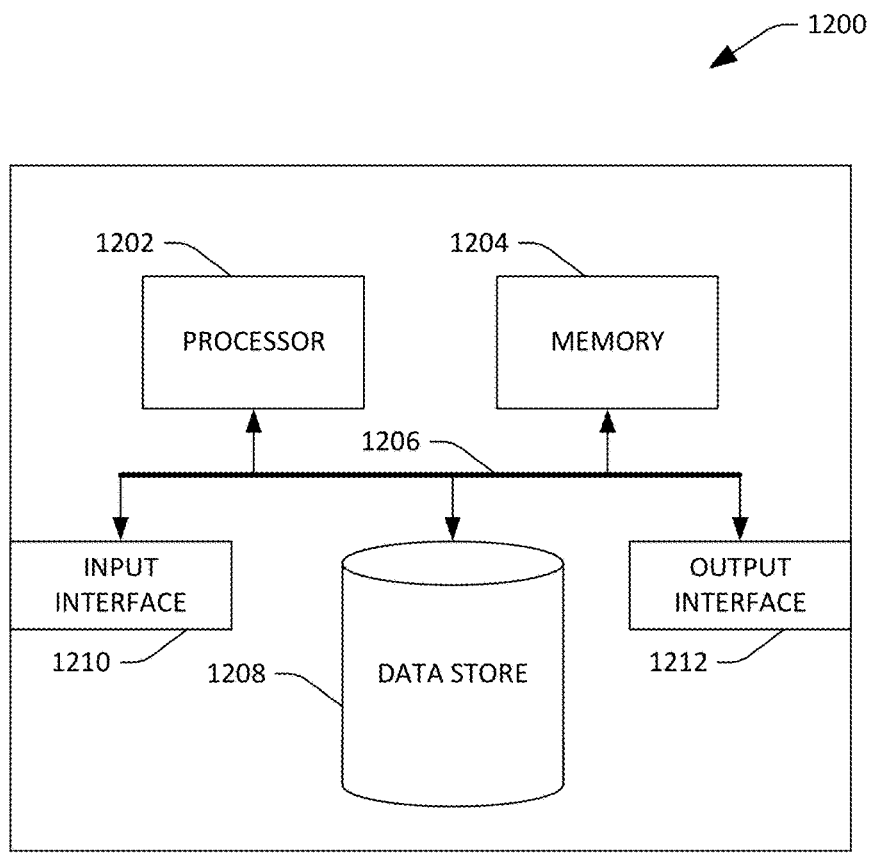
FIG. 12 is an exemplary computing system.

Referring now to FIG. 12, a high-level illustration of an exemplary computing device 1200 that can be used in accordance with the systems and methodologies disclosed herein is illustrated. For instance, the computing device 1200 may be used in a system that supports anticipating user interactions and constructing trees of transformations (e.g., the computing device 1200 may be the server computing device 104). By way of another example, the computing device 1200 can be used in a system that supports executing a transformation over a visualization to generate an updated visualization (e.g., the computing device 1200 may be the client computing device 102). The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store visualizations, transformations, rules, etc.

The computing device 1200 additionally includes a data store 1208 that is accessible by the processor 1202 by way of the system bus 1206. The data store 1208 may include executable instructions, a database, visualizations, transformations, rules, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A client computing device that is in network communication with a server computing device, the client computing device comprising:
   a processor; and
   memory that stores instructions that, when executed by the processor, cause the processor to perform acts comprising:
      constructing a command based upon a detected interaction with respect to a visualization presented on a display of the client computing device, the visualization having a first visualization state that describes the visualization, the command indicating that the visualization is to be updated to have a second visualization state;
      identifying, in a pre-fetch cache of the client computing device, a node that is labeled with a second visualization state, the node included in a hierarchical tree of nodes previously received from the server computing device, wherein the node is identified based upon the command and the first visualization state, and further wherein each node in the hierarchical tree of nodes represents a visualization transformation; and
      responsive to identifying the node, identifying a path in the hierarchical tree of nodes to the node that is labeled with the second visualization state;
      responsive to identifying the path, sequentially executing transformations represented by nodes along the path, wherein the visualization is updated to have the second visualization state once the transformations represented by the nodes along the path have been executed.

2. The client computing device of claim 1, the acts further comprising transmitting a message to the server computing device responsive to updating the visualization, the message indicating that the visualization has the second visualization state.

3. The client computing device of claim 1, the acts further comprising:
   when the visualization has the second visualization state, constructing a second command based upon a second detected interaction with respect to the visualization presented on the display, the second command indicating that the visualization is to be updated to have a third visualization state;
   determining that the pre-fetch cache fails to include a node that is labeled with the third visualization state;
   responsive to determining that the pre-fetch cache fails to include the node that is labeled with the third visualization state, transmitting a request to the server computing device to update the visualization to have the third visualization state; and
   rendering the updated visualization on the display responsive to receiving the updated visualization from the server computing device, the updated visualization having the third visualization state.

4. The client computing device of claim 1, further comprising an input interface that is configured to receive the interaction with respect to the visualization, the input interface being a touch-sensitive display.

5. The client computing device of claim 1, the transformations are written in a declarative language.

6. The client computing device of claim 1, the memory comprises a set of rules, the set of rules comprises a rule that maps a pair to the second visualization state, the pair includes the first visualization state and the command, wherein identifying that the pre-fetch cache comprises the node that is labeled with the second visualization state comprises searching the set of rules based upon the first visualization state and the command.

7. The client computing device of claim 1, wherein a transformation represented by the node that is labeled with the second transformation state is a root transformation, the root transformation being independent of the first visualization state.

8. The client computing device of claim 1, wherein the hierarchical tree of nodes includes the node labeled with the first visualization and the node labeled with the second visualization state, and further wherein the path in the hierarchical tree of nodes is between the node labeled with the first visualization state and the node labeled with the second visualization state, and further wherein the node labeled with the second visualization state is a child of the node labeled with the first visualization state.

9. The client computing device of claim 1, the visualization being one of a chart, a graph, or a table.

10. A method executed by a client computing device that is in communication with a server computing device, the method comprising:
    displaying a visualization on a display, the visualization has a first visualization state that at least partially defines the visualization;
    receiving, from the server computing device, a hierarchical tree of nodes that comprises a plurality of nodes, wherein the plurality of nodes are labeled with respective visualization states, and further wherein the plurality of nodes include respective visualization transformations;
    storing the hierarchical tree of nodes in a pre-fetch cache on the client computing device;
    detecting a request to modify the visualization to have a second visualization state;
    identifying a node in the plurality of nodes that is labeled with the second visualization state;
    responsive to identifying the node, identifying a path to the node in the hierarchical tree of nodes; and
    responsive to identifying the path, executing transformations included in nodes in the path in sequence to cause the visualization to be updated to have the second visualization state.

11. The method of claim 10, further comprising:
    receiving a second request to modify the visualization to cause the visualization to have a third visualization state;
    responsive to receiving the second request, identifying that the hierarchical tree of nodes fails to include a node that is labeled with the third visualization state;
    requesting an updated visualization from the server computing device responsive to identifying that the hierarchical tree of nodes fails to include the node that is labeled with the third visualization state;
    receiving the updated visualization from the server computing device; and
    displaying the updated visualization on the display, the updated visualization has the third visualization state.

12. The method of claim 10, the visualization transformations being in a declarative language.

13. The method of claim 10, wherein the path begins at a node labeled with the first visualization state.

14. The method of claim 10, wherein the path is independent of a node that is labeled with the first visualization state.

15. The method of claim 10, further comprising:
receiving a plurality of rules, each rule in the plurality of rules maps an initial visualization state to a destination visualization state by way of a respective command, wherein detecting the request to modify the visualization to have the second visualization state comprises searching the plurality of rules for a rule that includes both the first visualization state and a command that corresponds to the request, the command constructed by the client computing device responsive to detecting the request to modify the visualization.

16. The method of claim 10, further comprising:
transmitting a request for the visualization to the server computing device, the request identifying a data cube; and
receiving the visualization from the server computing device, the visualization being one of a chart, a graph, or a table that is based upon contents of the data cube.

17. A computer-readable storage medium on a client computing device, the computer-readable storage medium comprises instructions that, when executed by a processor, cause the processor to perform acts comprising:
displaying a visualization on a display, the visualization has a first visualization state;
receiving, from a server computing device in network communication with the client computing device, a hierarchical tree of nodes, the nodes include transformations, each node in the hierarchical tree of nodes is labeled with a respective visualization state;
receiving, from the server computing device, a plurality of rules, the plurality of rules include a rule that maps a pair [first visualization state, command] to a second visualization state;
detecting an interaction with respect to the visualization displayed on the display;
responsive to detecting the interaction, generating the command, the command being indicative of a modification to be made to the visualization;
identifying the rule in the plurality of rules based upon the visualization having the first visualization state and the command;
based upon the rule, identifying a node in the hierarchical tree of nodes that is labeled with the second visualization state;
responsive to identifying the node that is labeled with the second visualization state, identifying a path to the node in the hierarchical tree of nodes, the path includes a sequence of nodes; and
executing transformations includes in the sequence of nodes to cause the visualization on the display to be updated to have the second visualization state.

18. The computer-readable storage medium of claim 17, wherein the path begins at a node labeled with the first visualization state.

19. The computer-readable storage medium of claim 17, wherein the path fails to include a node labeled with the first visualization state.

20. The computer-readable storage medium of claim 17, the visualization being a chart or graph.

* * * * *